(12) United States Patent
Ishikawa

(10) Patent No.: US 6,375,267 B1
(45) Date of Patent: Apr. 23, 2002

(54) SEAT BACK FRAME STRUCTURE OF A VEHICLE SEAT

(75) Inventor: Takeshi Ishikawa, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/618,630

(22) Filed: Jul. 18, 2000

(30) Foreign Application Priority Data

Nov. 29, 1999 (JP) .............................................. 11-337483

(51) Int. Cl.[7] ................................................. A47C 7/02
(52) U.S. Cl. ................................................. 297/452.18
(58) Field of Search .......................... 297/452.18, 452.1

(56) References Cited

U.S. PATENT DOCUMENTS 5,626,395 A * 5/1997 Aufrere
5,918,943 A * 7/1999 Mitschelen et al.
6,082,823 A * 7/2000 Aumont et al.
6,132,003 A * 10/2000 Sakurai et al.

* cited by examiner

Primary Examiner—Milton Nelson, Jr.
(74) Attorney, Agent, or Firm—Browdy and Neimark, P.L.L.C.

(57) ABSTRACT

A structure of seat back frame for use in a seat back of a vehicle seat, which includes a lateral frame section connected with upper and lower frame sections to comprise the seat back frame. The lower end portion of such seat-back lateral frame section has been cut to provide a reduced lower end area therein. On the other hand, a connecting bracket member is provided, which has an upper end portion with a slant edge and also has a large thickness relative to that of the lateral frame section. In the present structure, the connecting bracket member is fixedly connected, at that upper end portion thereof, to the reduced lower end area of lateral frame section, in such a manner that the slant edge thereof extends in a downwardly inclined way as it proceeds toward a forward side of the seat back, i.e. a running direction of a vehicle.

8 Claims, 2 Drawing Sheets

SEAT BACK FRAME STRUCTURE OF A VEHICLE SEAT

BACKGROUND OF INVENTION

1. Field of the Invention

The present invention relates to a seat back framework of a vehicle or automotive seat, and in particular to a structure of seat back frame which includes a lateral frame section and a connecting bracket fixed to the lower end portion of that lateral frame section, wherein the connecting bracket is adapted for operative connection, via a reclining device or the like, with the side of a seat cushion frame.

2. Description of Prior Art

As shown, for instance, in FIG. 1, most of conventional seat back frameworks, designated by (BF), are generally of a rectangular configuration on the whole. Some of the seat back frameworks of this sort, as in the FIG. 1, comprise an upper frame section (18A), a lower frame section (18B) and a pair of lateral plate frame sections (14A) (14A) fixedly connected between the upper and lower frame sections (18A) (18B). A plurality of springs (15) are extended between the two lateral plate frame sections (14A) for the purpose of resiliently supporting the back of a person resting on the seat back frame (BF). While not shown, an elastic upholstery is attached over this seat back frame (BF) to produce a seat back, one of the constituent elements of a vehicle or automotive seat.

As illustrated, the seat back frame (BF) is rotatably connected via a pair of reclining devices (11) (11) or the like with a seat cushion frame (CF) such as to be selectively inclinable in the forward and backward directions with respect thereto. In particular, the lower end portions (14Ae) respectively of the pair of lateral plate frame sections (14A) are operatively connected with such two reclining devices (11) respectively.

In the foregoing construction of seat back frame (BF), however, a load is intensively applied to those lower end portions (14Ae) of lateral frame sections (14A) from a person resting on the seat back frame (BF) thus requiring a proper robustness of those particular portions (14Ae) to withstand a corresponding stress caused therein by the load. Particularly, in a collision case, as an excessive great load is intensively exerted upon the end portions (14Ae), a further increased rigidity is required therein to resist the load.

Hitherto, such problem has been solved by increasing the thickness of the lateral plate frame sections (14A), but it raises such problem that those particular frame sections (14A) themselves weigh greater unexpectedly, resulting in an inevitable cost increase, an unfavorable factor in practical assembly of seat cushion frame. Another attempt to solve the problem has been proposed by cutting off the lower portion of the lateral frame section (14A) and instead connecting a thickened rigid bracket member to the thus-cut lower portion of lateral frame section, to provide a robust structure of lateral frame section that avoids increase in weight and assembling costs of the seat cushion frame. In such conventionally proposed countermeasure, the thickened rigid bracket member is normally in a generally horizontal connection relation with the cut-off portion of lateral frame section. In other words, as both edges of the bracket member and lateral frame section are formed straight and sheer normally, the connected and juxtaposed areas between them naturally assumes a generally horizontal line in relation to the vertical line of the lateral frame section. Indeed, this provision of rigid bracket member adds to an effective reinforcement of the lower end portion of lateral frame section in question. But, to further amplify the reinforcement, one will be forced to consider increasing the length of thickened bracket member while further cutting off the remaining portion of lateral frame section itself, which will however unnecessarily expand an reinforcement area in the lateral frame section beyond its lower end portion that actually requires reinforcement as it is a main area to receive the load intensively.

This might again encounter the same high-cost and high-weight problem as above.

SUMMARY OF THE INVENTION

In view of the above-stated shortcomings, it is a primary purpose of the present invention to provide an improved seat back frame structure for use in a seat back of a vehicle seat, which insures to attain a reduction of its weight while maintaining a required reinforcement of the lateral frame section thereof.

In order to achieve such purpose, a structure of the seat back frame in the present invention is basically comprised of:

a reduced lower area defined in each of a pair of lateral frame sections of the seat back frame, the reduced lower area being defined by reducing a portion of each of a pair of lateral frame sections of the seat back frame which corresponds to lower end portion thereof, and having a lower edge; and a connecting bracket means having a slant edge so formed in one end thereof as to extend in a downwardly inclined manner as it proceeds toward one side of the seat back frame which is to face a forward side of the vehicle seat;

wherein the connecting bracket means and reduced lower area of each of the two lateral frame sections are juxtaposed and fixedly connected together such that a predetermined juxtaposition area is defined between those lower and slant edges in a direction from another side, which is to face a rearward side of the vehicle seat, toward the aforementioned one side.

Accordingly, dynamically stated, the upper end portion of the connecting bracket means, by the reason that it is formed slant, becomes larger in rigidity as it proceeds in the direction from the forward side to the rearward side of vehicle seat, which means that the rigidity becomes gradually lager in that direction. This gentle gradient of rigidity works to gradually disperse and reduce a load being applied from the forward side to the lateral frame section, whereby any immediate transmission of the load through the lateral frame section is blocked, and at the same time, dispersion of the load becomes larger along the slant edge, thereby positively preventing the load's intensive exertion on one localized point in the lateral frame section. At the same time, such partial increase of connecting bracket means, only at a point where a compressive load applies, limits its rigidity precisely thereto and thus eliminates any unnecessary increase of its weight. Therefore, both light weight and increased rigidity aspects can be achieved in the seal back frame.

Preferably, the lower end portion of the lateral frame section may also be formed with a slant edge as likewise in the slant edge of connecting bracket means, so that a slant juxtaposition area is defined in a downwardly inclined way in the direction from the rearward side to the forward side.

Preferably, an upwardly protruded portion may be formed in the rearward-side end area of the slant edge of connecting bracket means and disposed within a predetermined area of the lateral frame section to which an upper frame section of the seat back frame is fixedly connected.

Any other advantages and features of the present invention will become apparent from reading of the descriptions hereinafter with reference to the annexed drawings.

DETAILED DESCRIPTION OF PREFERRED EMBODIMENT OF THE INVENTION

Figure 1:
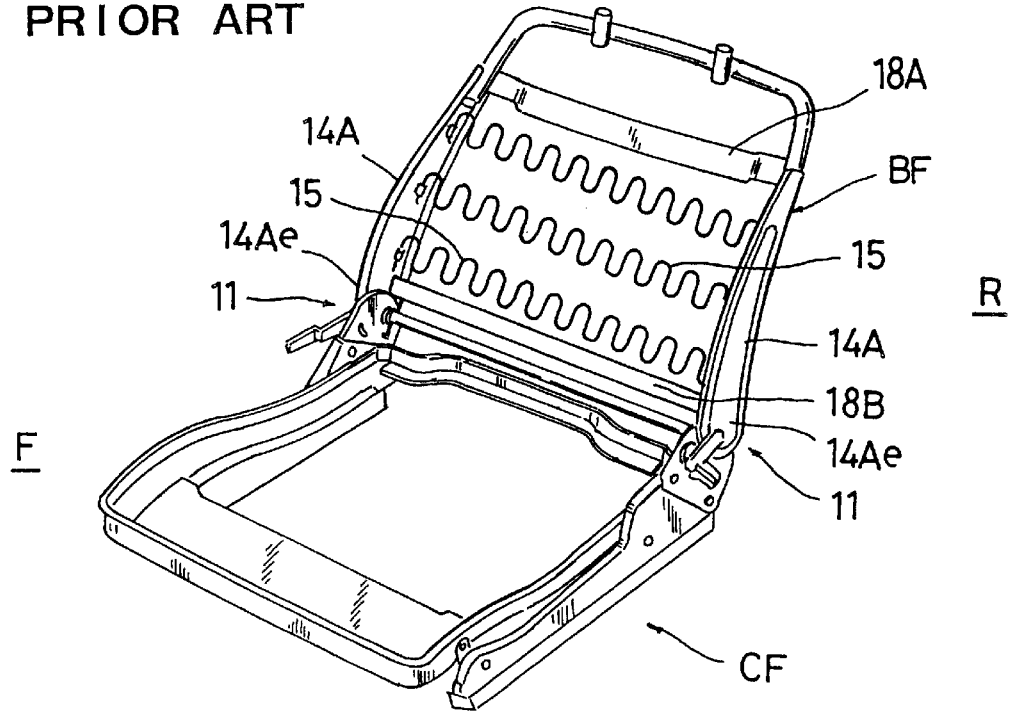
FIG. 1 is a schematic perspective view of a conventional seat framework of an automotive seat, which typically comprises a seat back frame and a seat cushion frame.
Figure 2:
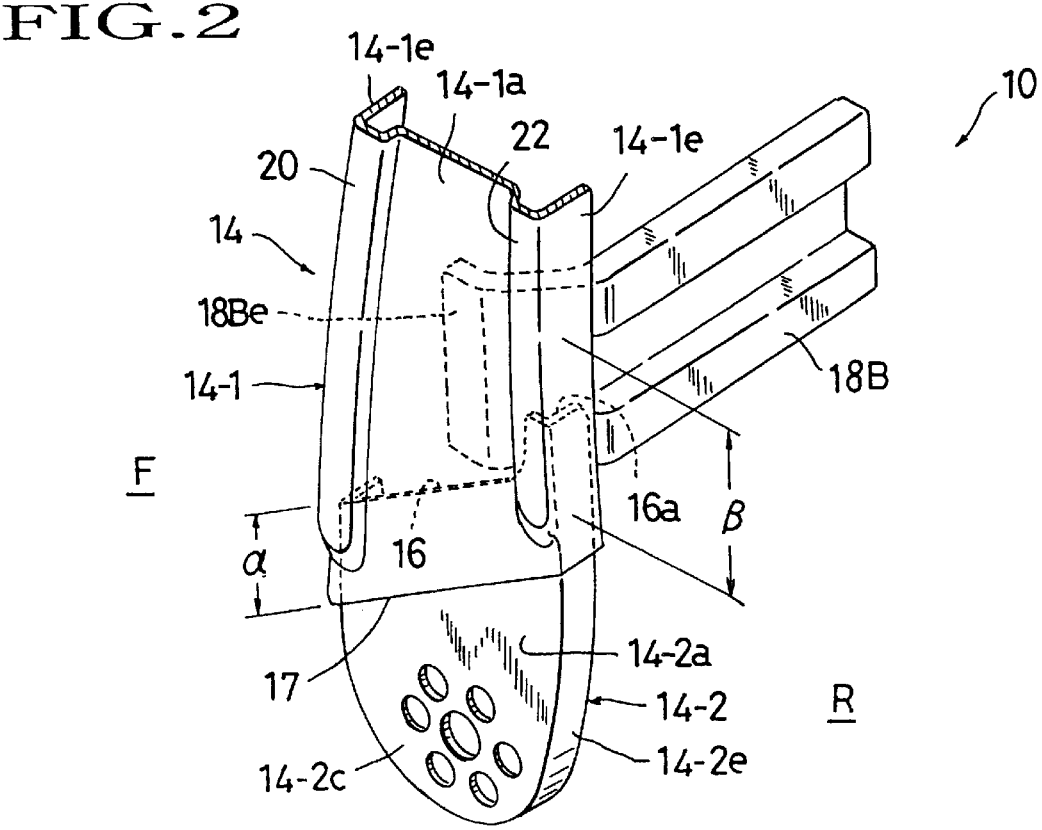
FIG. 2 is a partly broken, schematic perspective view of a principal part of the present invention in the seat back frame structure.
Figure 3:
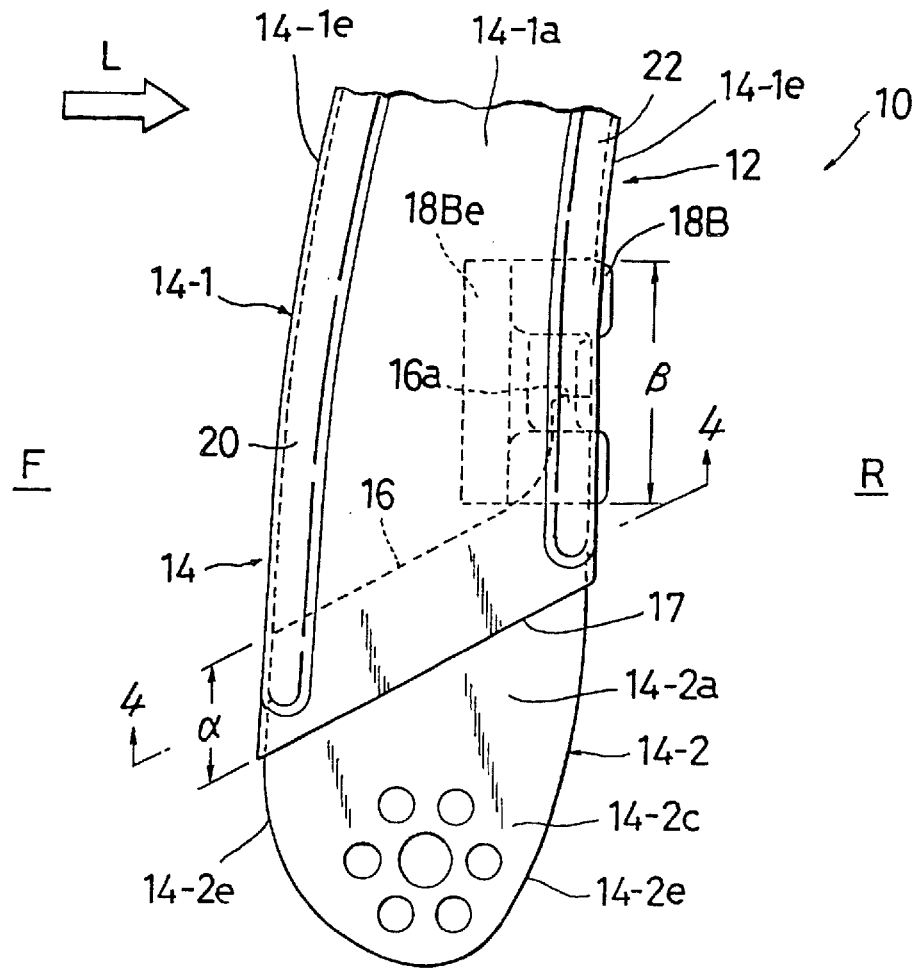
FIG. 3 is a partly broken, schematic side view of the seat back frame structure of the present invention.
Figure 4:
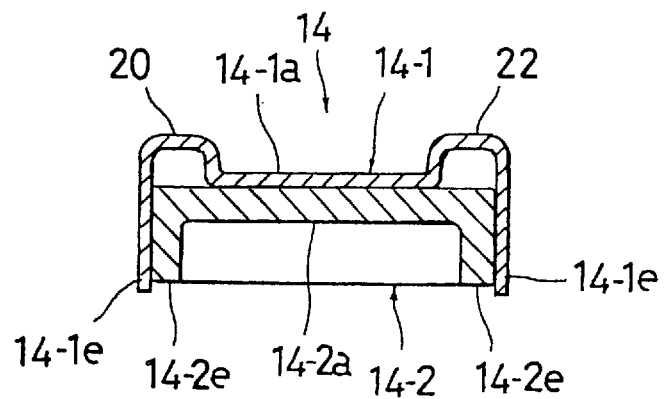
FIG. 4 is a sectional view taken along the line 4—4 in the FIG. 3.

Referring to FIGS. 2 to 4, there is illustrated one exemplary mode of seat back frame structure in the present invention, as generally designated by (10). It should be first understood that this is an improvement based on the conventional structure of seat back frame (BF) which has been described earlier with reference to FIG. 1, and in particular concerned with the lower end portion (14Ae) of the lateral frame section (14A). Thus, the present invention utilizes such conventional seat back frame (BF) as shown in FIG. 1, and offers a novel improvement on the basis thereof, which will be described in detail. Any further specific description about the common parts and elements is therefore deleted for the sake of simplicity, and all like designations to be used hereinafter correspond to all like designations given in the preceding prior-art description and FIG. 1.

By way of a most preferred embodiment, as shown in FIGS. 2 and 3, the seat back frame structure (10) contemplated in the present invention employs a structure of lateral plate frame section, as generally designated by (14), which comprises a main lateral frame body (14-1) having an lower slant edge (17) and a connecting rigid bracket member (14-2) having an upper slant edge (16). It should be understood here that, although not shown, the main lateral frame body (14-1) and bracket member (14-2) are each provided in pairs in the seat back frame (BF) as understandable from FIG. 1 in conjunction with the prior-art two lateral frame sections (14A) (14A), and that, in the descriptions below, one main lateral frame body (14-1) and one bracket member (14-2) will each be described and illustrated with reference to FIGS. 2 to 4 and FIG. 1, for simplicity.

Specifically stated now, the main lateral frame body (14-1) is generally similar in shape to the prior-art lateral frame section (14A) and connected between the upper and lower frame sections (18A) (18B), as can been seen from both FIGS. 1 and 2. The main lateral frame body (14-1) per se is of a generally "U" shape in cross-section, comprising a planar horizontal wall region (14-1a) and a pair of vertical lateral wall regions (14-1e), each extending by a right angle from the respective two ends of the horizontal wall region (14-1a), as known in the art. But, in accordance with the present invention, the main lateral frame body (14-1) is so cut at its lower end portion as to provide a reduced lower end area for the purpose of connection with the connecting bracket member (14-2) as will be described later. In the preferred embodiment shown, such reduced lower end area of frame body (14-1) may be formed with a lower slant edge (17) which extends in a downwardly inclined way as it proceeds towards a forward side (F) as in FIG. 2. It should be noted that, in all the figures, the character (F) stands for the forward side with respect to the seat back frame (BF), which is indicative of a forward running direction of a vehicle or the side where an occupant sits on a seat incorporating the whole seat framework as in FIG. 1, whereas the character (R) for the rearward side with respect to the seat back frame (BF), indicative of the side therebehind, as best seen in FIG. 1. The lateral frame body (14-1) is therefore smaller in length than the whole prior-art lateral frame section (14A). Further, press formed along the two respective sides of frame body (14-1) are a first reinforcing protrusion or bead (20) at the forward side (F) and a second reinforcing bead (21) at the rearward side (R). As shown, both first and second reinforcing beads (20) (21) are so formed to terminate in a point spaced from the lower slant edge (17)

On the other hand, the rigid connecting bracket member (14-2), adapted for connection with one of the two reclining mechanisms (11), has an upper slant edge (16). The upper slant edge (16), as likewise in the afore-said lower slant edge (17), extends in the downwardly inclined way as it proceeds towards the forward side (F) It is preferred that both upper and lower slant edges (16) (17) should be of a same inclination angle with each other, The bracket member (14-2) is of a generally bullet-like contour having a connecting area (14-2c) defined at the lower arcuate end region thereof, which is adapted for firm connection with a shaft (not shown) of the reclining mechanism (M), and has a generally "U" shape in cross-section, such that a planar horizontal wall region (14-2a) is defined therein, with a peripheral vertical wall region (14-2e) extending integrally along the peripheral end of the horizontal wall (14-2a) and projecting by right angle therefrom. Designation (16a) denotes an upwardly protruded portion so formed to project integrally from the upper slant edge (16) in the upward direction. This portion (16a) is defined therein at the rearward side (R), having thus an "L" cross-section inclusive of both local areas of the planar and peripheral wall regions (14-2a) (14-2e) at that side (R). As shown in FIG. 4, a greater thickness is given in the bracket member (14-2) than that of the main lateral frame body (14-1), taking into account an intensive exertion of a load on the former. But, the bracket member (14-2) per se is, at its upper end portion, of a contour suited to be fit accommodated in the inward side of the lower end portion of lateral frame body (14-1).

In assembly, first, a certain margin (or welding margin) is set in each of upper and lower end portions respectively of the bracket member (14-2) and main lateral frame body (14-1) such as to define a slant juxtaposition area (α) therebetween as illustrated, when the two elements (14-2) (14-1) are coupled at that margin together as by welding. Thus, as shown in the figures, by being juxtaposed together at their respective margins, the bracket member (14-2) and lateral frame body (14-1) are firmly connected together as by spot welding at plural points for instance, such that a predetermined slant juxtaposition area (α) is defined therebetween, extending transversely of the coplanar wall regions of those two elements (14-1) (14-2) in a downwardly inclined fashion as they proceed toward the forward side (F). Then, the lower frame section (18B) is, at its securing end (18Be), fixedly connected as by welding to the coplanar inward side of wall region (14-1a) of the lateral frame body (14-1) within a predetermined fixing area (β), as shown in FIGS. 2 and 3. In this respect, situated midway in that area (β) is the previously stated upwardly protruded portion (16a) associated with the bracket member (14-2) such as to be located at the same level with the lower frame section (18B).

The above-described structure is contemplated in view of the dynamical phenomenon that a load normally applied in the arrow direction (L) from a passenger is intensively exerted upon the lower end portion of lateral frame section of seat back frame, causing a great compressive load thereto at the rearward side (R) while simultaneously causing a great tensile load thereto at the forward side (F). Namely, the inventor has noticed that the long lateral frame body (14-1), irrespective of its small thickness, sufficiently resists and absorbs the great tensile load, and on the other hand, the great compressive load caused in the lower local area of lateral frame section can be withstood only by the small mass of bracket member (14-2) having a large thickness relative to the lateral frame body (14-1). Based on this factor, forming the above-discussed slant edges (16) and (17) in the bracket member (14-2) and frame body (14-1), respectively, leads to the advantage that the forward portion of the frame body (14-1) becomes large in both length and area as it proceeds toward the forward side (F), thereby attaining an enough reinforcement against the tensile load, while on the other hand, the rearward portion of the bracket member (14-2) becomes large in length and area as it proceeds toward the rearward side (R), hence providing an amplified reinforcement against the compressive load.

With such physically ideal structure, both light weight and increased rigidity can be achieved in the seat back frame, since the partial increase of connecting bracket member (14-2) only at a point where the compressive load applies, limits an increased rigidity precisely to that point and thus eliminates any unnecessary increase of its weight. Of course, the main lateral frame body (14-1) is also reduced in weight while being enhanced in rigidity at the required point where the tensile load applies. In the aggregate, therefore, such dual effects insure to reduce the weight of whole seat back frame and total costs involved in the assembly thereof.

More dynamically stated in this context, the upper end portion of the connecting bracket member (14-2), by the reason that it is formed slant, becomes larger in rigidity as it proceeds in the direction from the forward side (F) to the rearward side (R), which means that the rigidity becomes gradually lager in that direction. This gentle gradient of rigidity works to gradually disperse and reduce a load (L) being applied from the forward side (F), as in FIG. 3, to the frame body (14-1), whereby any immediate transmission of the load through the frame body (14-1) is blocked, and at the same time, dispersion of the load becomes larger along the slant edge (16), thereby positively preventing the load's intensive exertion on one localized point in the whole lateral frame section (14). In addition, the upwardly protruded portion (16a) formed in the upper slant edge (16) is disposed within the area (β) where the lower frame section (18B) is fixed to the lateral frame body (14-2), whereupon there is established another load transmission passage toward the lower frame section (18B), in addition to the load transmission via the bracket member (14-2) toward the reclining mechanism (M) or the seat cushion frame (CF). Accordingly, it is appreciated that the load (L) thus dispersed and reduced by such rigidity gradient structure is further escaped through the upwardly protruded portion (16a) and lower frame section (18B) to the outside of the lateral frame section (14), by virtue of which, additional dispersion of the load is attained, making it more positive to prevent the intensive load exertion mentioned above or a corresponding intensive stress caused in the lateral frame section (14).

Moreover, the previously stated two reinforcing beads (20) (21) add to the reinforcement of the main lateral frame body (14-1) itself, which is effective to prevent the frame body (14-1) against twisty deformation by an excessive impact given thereto from a great load input in the lower frame section (18B) in a collision case or the like. In particular, as noted above, a spacing is provided between the two reinforcing beads (20) (21) and the lower slant edge (17), as can be seen from both FIGS. 2 and 3. This arrangement avoids the presence of non-contact points between the lateral frame body (14-1) and bracket member (14-2) due to the inner hollow regions of the protruded reinforcing beads (20) (21) and therefore maintains a continuous contact and fixation therebetween in the whole width-wise direction of both frame body (14-1) and bracket member (14-2). Accordingly, it is possible to insure avoiding incomplete fixation between those two elements (14-1) (14-2) and attain a far-increased reinforcement of the lateral frame section per se.

While having described the present invention above, it should be understood that the invention is not limited to the illustrated embodiments, but any other modifications, replacements and additions may be structurally applied thereto without departing from the scopes of the appended claims. Of course, the present invention may be applied to a seat used in all ranges of vehicles, such as train, airplane and vessel.

What is claimed is:

1. In a structure of a seat back frame adapted for use in a seat back of a vehicle seat, wherein the seat back frame has one side and another side in relation thereto, said one side and another side each respectively adapted to face a forward side and a rearward side of the vehicle seat, wherein the seat back frame essentially consists of an upper frame section, a lower frame section and a pair of lateral frame sections defined between said upper and lower frame sections, and wherein said pair of lateral frame sections each has a lower end portion adapted to be connected to connecting means provided in the vehicle seat, the structure of said seat back frame comprising:
a lower area defined in each of said pair of lateral frame sections which corresponds to said lower end portion thereof and has a lower edge; and
a connecting bracket means having a slant edge so formed in one end thereof as to extend in a downwardly inclined manner as it proceeds toward said one side of said seat back frame, said connecting bracket means being of a large thickness relative to that of said each of the lateral frame sections,
wherein said connecting bracket means and said lower area of each of said pair of lateral frame sections are juxtaposed and fixedly connected together such that a predetermined juxtaposition area is defined between said lower edge and said slant edge in a direction from said another side to said one side of said seat back frame.

2. The structure as defined in claim 1, wherein said each of the pair of lateral frame sections is formed integrally with a pair of spaced-apart reinforcing protrusions, by press working, along the longitudinal direction thereof, such that one of said pair of spaced-apart protrusions extends therealong at said one side whereas another of said pair of lateral frame sections extends therealong at said another side, and wherein both said pair of spaced-apart protrusions terminate in a point spaced from said lower edge.

3. The structure as defined in claim 1, wherein said lower frame section is fixedly connected to each of said pair of lateral frame sections at a predetermined fixing area, wherein said slant edge of the connecting bracket means has a rearward edge portion defined therein at said another side, and wherein said connecting bracket means is juxtaposed and fixedly connected to said each of the pair of lateral frame sections in such a manner that said rearward edge portion associated with the connecting bracket means is located within said predetermined fixing area.

4. The structure according to claim 3, wherein both said pair of lateral frame sections and connecting bracket means are of generally "U" shape in cross-section, wherein said each of the pair of lateral frame sections has an inward side, whereas said connecting bracket means has an outer side which is slightly smaller in size than said inward side of said each of the pair of lateral frame sections, and wherein said connecting bracket means is, at the outer side thereof, juxtaposed and fixedly connected with said inward side of said each of the pair of lateral frame sections.

5. The structure according to claim 3, wherein said rearward edge portion is so formed as to protrude upwardly from said slant edge of the connecting bracket means.

6. In a structure of a seat back frame adapted for use in a seat back of a vehicle seat, wherein the seat back frame has one side and another side in relation thereto, said one side and another side each respectively adapted to face a forward side and a rearward side of the vehicle seat, wherein the seat back frame essentially consists of an upper frame section, a lower frame section and a pair of lateral frame sections defined between said upper and lower frame sections, and wherein said pair of lateral frame sections each has a lower end portion adapted to be connected to connecting means provided in the vehicle seat, the structure of said seat back frame comprising:
  a lower area defined in each of said pair of lateral frame sections, said lower area being defined by a portion of each of said pair of lateral frame sections which corresponds to said lower end portion thereof;
  a first slant edge so formed in said lower area as to extend in a downwardly inclined manner as it proceeds toward said one side of said seat back frame; and
  a connecting bracket means having a second slant edge so formed in one end thereof as to extend in a downwardly inclined manner as it proceeds toward said one side of said seat back frame, said connecting bracket means being of a large thickness relative to that of said each of the pair of lateral frame sections,
  wherein said connecting bracket means and said lower area of each of said pair of lateral frame sections are juxtaposed and fixedly connected together such that a predetermined slant juxtaposition area is defined between said first and second slant edges in a downwardly inclined fashion in a direction from said another side to said one side of said seat back frame.

7. The structure as defined in claim 6, wherein said each of the pair of lateral frame sections is formed integrally with a pair of spaced-apart reinforcing protrusions, by press working, along the longitudinal direction thereof, such that one of said pair of spaced-apart protrusions extends therealong at said one side, having a greater length than that of another of said pair of spaced-apart protrusions which extends therealong at said another side, and wherein both said pair of spaced-apart protrusions terminate in a point spaced from said lower edge.

8. The structure as defined in claim 6, wherein said lower frame section is fixedly connected to each of said pair of lateral sections at a predetermined fixing area, wherein said slant edge of the connecting bracket means has a rearward edge portion defined therein at said another side, and wherein said connecting bracket means is juxtaposed and fixedly connected with said each of the pair of lateral frame sections, such that said rearward edge portion associated with the connecting bracket means is located within said predetermined fixing area.

* * * * *